United States Patent
Aoyama et al.

(10) Patent No.: US 11,168,613 B2
(45) Date of Patent: Nov. 9, 2021

(54) GAS TURBINE COOLING ARRANGEMENT WITH COOLING MANIFOLD GUIDES

(71) Applicant: MITSUBISHI HEAVY INDUSTRIES, LTD., Tokyo (JP)

(72) Inventors: Kuniaki Aoyama, Tokyo (JP); Jo Masutani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 246 days.

(21) Appl. No.: 16/095,536

(22) PCT Filed: Apr. 17, 2017

(86) PCT No.: PCT/JP2017/015432
§ 371 (c)(1),
(2) Date: Oct. 22, 2018

(87) PCT Pub. No.: WO2017/188040
PCT Pub. Date: Nov. 2, 2017

(65) Prior Publication Data
US 2019/0128190 A1    May 2, 2019

(30) Foreign Application Priority Data
Apr. 25, 2016  (JP) .............................. JP2016-086800

(51) Int. Cl.
*F02C 7/18*      (2006.01)
*F01D 25/12*    (2006.01)
(Continued)

(52) U.S. Cl.
CPC ................ *F02C 7/185* (2013.01); *F01D 9/02* (2013.01); *F01D 9/041* (2013.01); *F01D 9/06* (2013.01);
(Continued)

(58) Field of Classification Search
CPC .... F02C 6/08; F02C 7/18; F02C 7/185; F02C 9/18; F02C 9/52; F01D 5/08; F01D 5/081;
(Continued)

(56) References Cited

U.S. PATENT DOCUMENTS 2,618,433 A    11/1952  Loos et al.
3,936,215 A *   2/1976  Hoff ........................ F01D 5/081
                                                                415/115
(Continued)

FOREIGN PATENT DOCUMENTS

CN    101178014    5/2008
CN    102032047    4/2011
(Continued)

OTHER PUBLICATIONS

Written Opinion dated May 30, 2017 in International (PCT) Application No. PCT/JP2017/015432, with English-language translation.
(Continued)

*Primary Examiner* — Alain Chau
(74) *Attorney, Agent, or Firm* — Wenderoth, Lind & Ponack, L.L.P.

(57) ABSTRACT

A gas turbine includes a compressor; a combustor; a turbine configured to drive a rotational shaft of the compressor using combustion gas generated by the combustor; a cooling device configured to generate cooling air by bleeding compressed air from the compressor and cooling the compressed air, and to supply the cooling air to the turbine along the rotational shaft; a pressurizing device configured to increase pressure of the cooling air; a pressurizing device diffuser configured to provide a passage continuing in a turbine circumferential direction, on the outer side in the turbine radial direction to guide the cooling air having the increased pressure to the outer side of the pressurizing device; and a
(Continued)

manifold disposed between the pressurizing device diffuser and a plurality of turbine vanes so that a ring-shaped passage communicates with the passage in the pressurizing device diffuser and a cooling passage provided inside each turbine vane.

3 Claims, 5 Drawing Sheets

(51) Int. Cl.
*F01D 9/02* (2006.01)
*F01D 9/04* (2006.01)
*F01D 9/06* (2006.01)

(52) U.S. Cl.
CPC ............... *F01D 25/12* (2013.01); *F02C 7/18* (2013.01); *F05D 2220/32* (2013.01); *F05D 2240/12* (2013.01); *F05D 2260/202* (2013.01); *F05D 2260/606* (2013.01)

(58) Field of Classification Search
CPC .......... F01D 5/082; F01D 5/084; F01D 5/085; F01D 5/143; F01D 9/00; F01D 9/04; F01D 9/06; F01D 9/065; F01D 25/08; F01D 25/12
See application file for complete search history.

(56) References Cited

U.S. PATENT DOCUMENTS

| | | | | |
|---|---|---|---|---|
| 3,949,549 | A * | 4/1976 | Holl | F02C 7/185 60/226.1 |
| 4,178,129 | A * | 12/1979 | Jenkinson | F01D 5/081 416/193 A |
| 4,236,869 | A * | 12/1980 | Laurello | F01D 5/081 416/95 |
| 5,163,285 | A | 11/1992 | Mazeaud et al. | |
| 6,065,282 | A * | 5/2000 | Fukue | F02C 7/185 415/115 |
| 6,250,061 | B1 | 6/2001 | Orlando | |
| 6,612,114 | B1 * | 9/2003 | Klingels | F01D 5/187 60/785 |
| 7,147,431 | B2 * | 12/2006 | Maguire | F01D 9/04 415/115 |
| 7,303,372 | B2 * | 12/2007 | West | F01D 9/065 415/208.1 |
| 8,414,263 | B1 * | 4/2013 | Liang | F01D 5/186 416/96 R |
| 9,797,261 | B2 * | 10/2017 | Tibbott | F01D 5/188 |
| 9,920,643 | B2 * | 3/2018 | Manzoori | F02C 7/18 |
| 2008/0112795 | A1 | 5/2008 | Lee et al. | |
| 2008/0310955 | A1 * | 12/2008 | Norris | F02C 7/185 415/178 |
| 2009/0324386 | A1 | 12/2009 | Takamura et al. | |
| 2011/0079021 | A1 | 4/2011 | Maldonado | |
| 2015/0285096 | A1 * | 10/2015 | Spangler | F01D 5/189 415/115 |
| 2015/0330238 | A1 * | 11/2015 | Manzoori | F02C 7/18 415/115 |

FOREIGN PATENT DOCUMENTS

| | | |
|---|---|---|
| CN | 102076940 | 5/2011 |
| EP | 2 949 866 | 12/2015 |
| JP | 4-209934 | 7/1992 |
| JP | 05-086901 | 4/1993 |
| JP | 2000-257446 | 9/2000 |

OTHER PUBLICATIONS

Office Action issued in corresponding Chinese Patent Application No. 201780025298.3, with English Translation.

* cited by examiner

GAS TURBINE COOLING ARRANGEMENT WITH COOLING MANIFOLD GUIDES

FIELD

The present invention relates to a gas turbine.

BACKGROUND

A general gas turbine includes a compressor that generates compressed air, a combustor that generates combustion gas using the compressed air generated by the compressor, and a turbine that is driven in rotation by the combustion gas generated by the combustor. Japanese Patent Application Laid-open No. H5-86901, for example, discloses providing such a gas turbine with an air pressurizing device between the compressor and cooled vanes (turbine vanes) for increasing the pressure of the air discharged from the compressor.

The air pressurizing device disclosed in Japanese Patent Application Laid-open No. H5-86901 is implemented as a centrifugal compressor having vanes provided in a manner extending in radial directions, so that the air pressure is increased as the turbine shaft is rotated. In this centrifugal compressor, the vanes are surrounded by partitioning plates jutting out from turbine vanes toward the inner circumferential side. The cooling air having the pressure increased between the partitioning plates is supplied to the turbine vanes, through the holes provided on the inner circumferential wall on the inner circumference of the turbine vanes. However, with such a configuration, the pressure drops disadvantageously in the space leading from the centrifugal compressor to the turbine vanes.

The present invention is intended to address the issue described above, and an object of the present invention is to provide a gas turbine capable of suppressing a drop in the pressure of the cooling air to be supplied to the turbine vanes.

SUMMARY OF THE INVENTION

To achieve the object described above, a gas turbine according to an aspect of the present invention includes a compressor configured to rotate about a rotational shaft to generate compressed air; a combustor configured to generate combustion gas using the compressed air generated by the compressor; a turbine configured to drive the rotational shaft in rotation using the combustion gas generated by the combustor; a cooling device configured to generate cooling air by bleeding the compressed air from the compressor and cooling the compressed air, and to supply the cooling air to the turbine along the rotational shaft; a pressurizing device disposed between the cooling device and the turbine to increase pressure of the cooling air toward an outer side in a turbine radial direction as the rotational shaft rotates; a pressurizing device diffuser configured to provide a passage continuing in a turbine circumferential direction, on the outer side of the pressurizing device in the turbine radial direction so as to guide the cooling air having pressure increased by the pressurizing device to the outer side of the pressurizing device in the turbine radial direction; and a manifold disposed between the pressurizing device diffuser and a plurality of turbine vanes that are arranged in a row along the turbine circumferential direction so as to provide a ring-shaped passage continuing in the turbine circumferential direction so that the ring-shaped passage communicates with the passage in the pressurizing device diffuser and a cooling passage provided inside each of the turbine vanes.

With this gas turbine, the pressurizing device diffuser guides the cooling air having the pressure increased by the pressurizing device toward the outer side in the turbine radial direction, and the manifold supplies the cooling air guided toward the outer side in the turbine radial direction by the pressurizing device diffuser to the cooling passage provided in each of the turbine vanes. As a result, it is possible to suppress a drop in the pressure of the cooling air having the pressure increased by the pressurizing device and to be supplied to the turbine vanes.

Furthermore, it is preferable that the gas turbine according to an aspect of the present invention includes a guide vane provided inside the ring-shaped passage of the manifold to guide the cooling air toward the cooling passage in the turbine vane.

With this gas turbine, it is possible to suppress a drop in the pressure of the cooling air to be supplied from the manifold to the cooling passage. As a result, it is possible to further suppress a drop in the pressure of the cooling air having the pressure increased by the pressurizing device and to be supplied to the turbine vanes.

Furthermore, it is preferable that the gas turbine according to an aspect of the present invention includes a curved section that guides the cooling air in an inlet section of the cooling passage in the turbine vane, the inlet section being a section where the cooling passage communicates with the manifold.

With this gas turbine, it is possible to suppress a drop in the pressure of the cooling air to be supplied from the manifold to the cooling passage. As a result, it is possible to further suppress a drop in the pressure of the cooling air having the pressure increased by the pressurizing device and to be supplied to the turbine vanes.

Advantageous Effects of Invention

According to the present invention, it is possible to suppress a drop in the pressure of the cooling air to be supplied to the turbine vanes.

DETAILED DESCRIPTION OF EMBODIMENTS OF THE INVENTION

An embodiment according to the present invention will now be explained in detail with reference to some drawings. The embodiment is, however, not intended to limit the scope of the present invention in any way. Furthermore, elements described in the embodiment below include elements that allow the skilled person to easily replace, or elements that are substantially the same.

Figure 1:
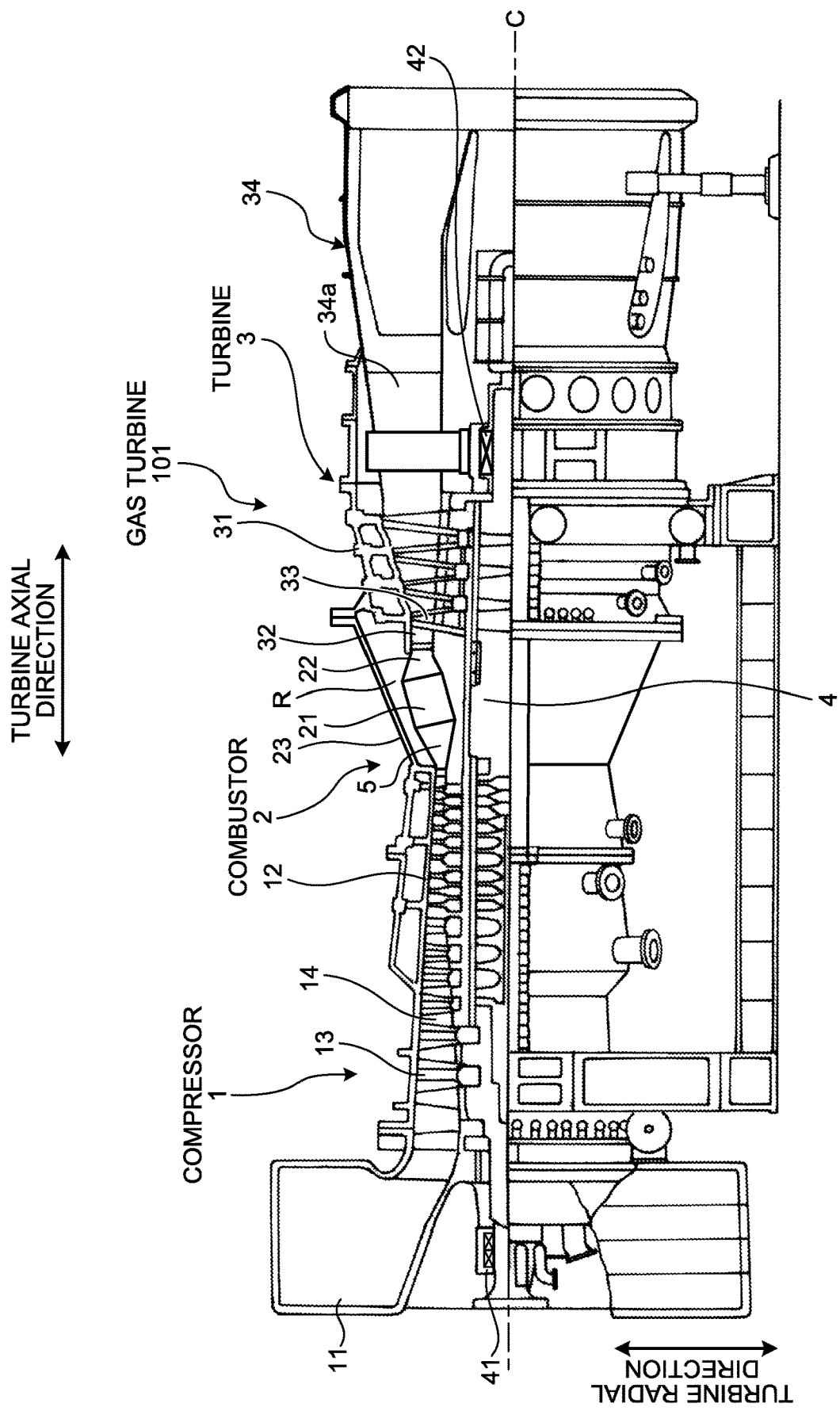
FIG. 1 is a schematic diagram illustrating a general structure of a gas turbine according to an embodiment of the present invention.
Figure 2:
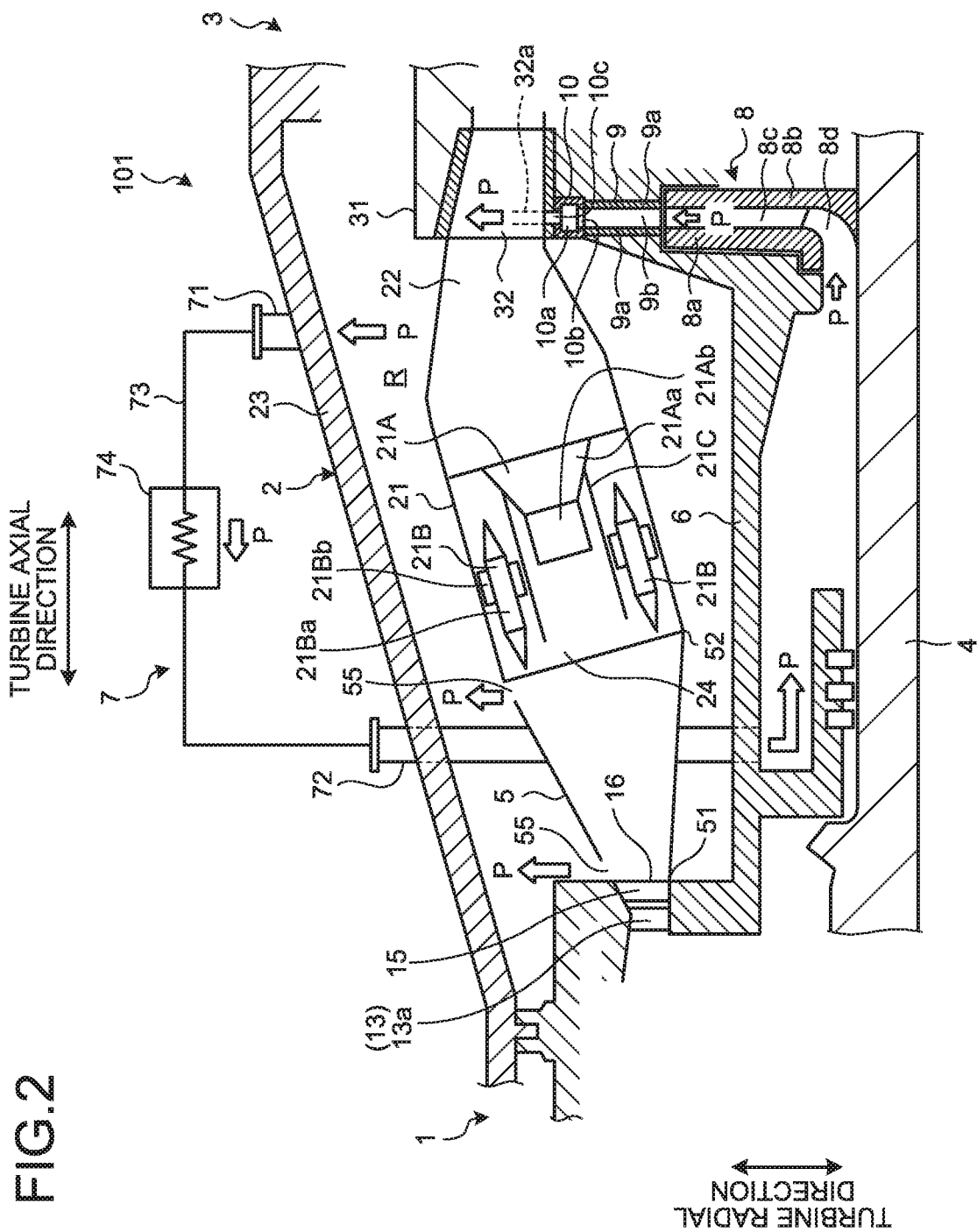
FIG. 2 is an enlarged sectional view around a combustor in the gas turbine according to the embodiment of the present invention.
Figure 3:
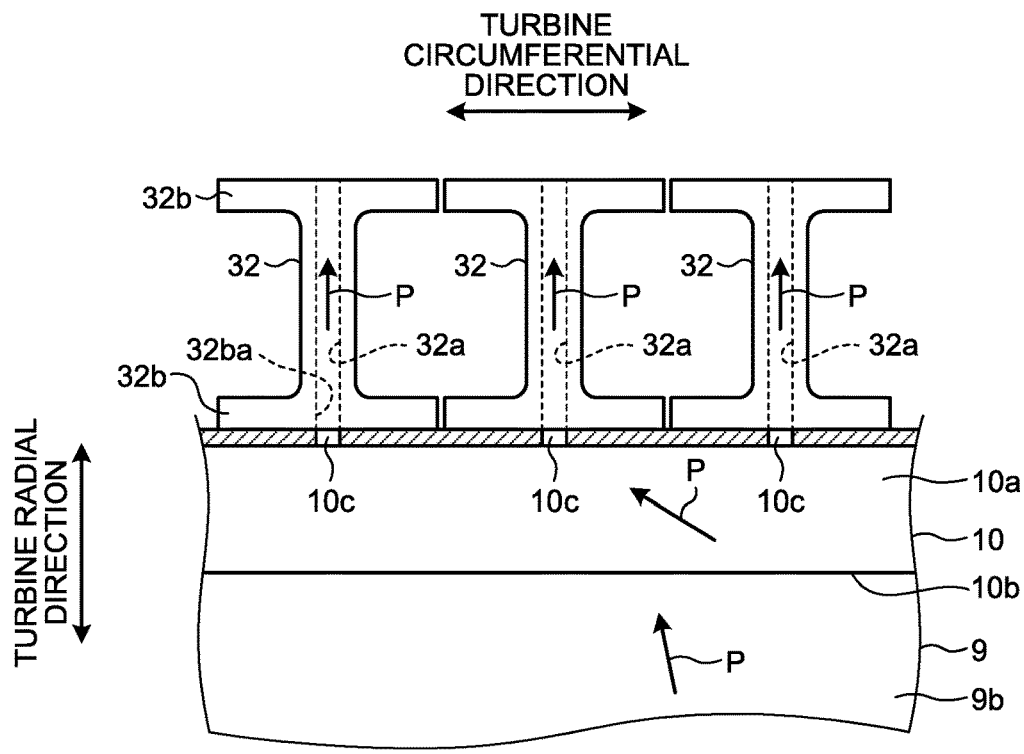
FIG. 3 is a generalized enlarged view of a part of the meridional section of the gas turbine according to the embodiment of the present invention.

FIG. 1 is a schematic illustrating a general structure of a gas turbine according to the embodiment. FIG. 2 is an enlarged sectional view near a combustor in the gas turbine according to the embodiment. FIG. 3 is a generalized enlarged view of a part of the meridional section of the gas turbine according to the embodiment.

As illustrated in FIG. 1, this gas turbine 101 includes a compressor 1, a combustor 2, and a turbine 3. In this gas turbine 101, a turbine shaft 4 that is the rotational shaft is disposed in a manner passing through the center of the compressor 1, the combustor 2, and the turbine 3. The compressor 1, the combustor 2, and the turbine 3 are arranged in a row, sequentially from the front side to the rear side in the direction of the air flow along the center axis C of the turbine shaft 4. In the explanation hereunder, a turbine axial direction refers to a direction extending in parallel to the center axis C. A turbine circumferential direction refers to a direction rotating about the center axis C. A turbine radial direction refers to a direction perpendicularly intersecting with the center axis C. An inner side in the turbine radial direction refers to a side nearer to the center axis C in the turbine radial direction, and an outer side in the turbine radial direction refers to a side more distanced from the center axis C in the turbine radial direction.

The compressor 1 compresses the air into compressed air. The compressor 1 includes compressor vanes 13 and compressor blades 14 that are provided inside a compressor casing 12 having an air intake 11 through which the air is collected. A plurality of the compressor vanes 13 are arranged in rows along the turbine circumferential direction in a manner attached to the compressor casing 12. A plurality of the compressor blades 14 are arranged in rows along the turbine circumferential direction with the turbine shaft 4 at the center in a manner attached to the turbine shaft 4. The compressor vanes 13 and the compressor blades 14 are provided alternatingly along the turbine axial direction. The compressor 1 has an outlet 16 provided with a plurality of last stage vanes 13a that are arranged in a row along the turbine circumferential direction. In the compressor 1, the outlet 16 is sometimes provided with a plurality of exit guide vanes 15 that are arranged in a row along the turbine circumferential direction, at a position downstream of the last stage vanes 13a.

The combustor 2 generates high-temperature and high-pressure combustion gas by supplying fuel to the compressed air compressed by the compressor 1. The combustor 2 includes a combustion chamber 21 in which the compressed air is mixed with fuel and combusted, and a transition piece 22 that guides the combustion gas from the combustion chamber 21 to the turbine 3. A plurality of (e.g., sixteen) the combustion chambers 21 are arranged in a row along the turbine circumferential direction with the turbine shaft 4 at the center inside a combustor casing 23 having a cylindrical shape that provides a combustor casing chamber R.

Each of the combustion chambers 21 has a tubular shape, as illustrated in FIG. 2. Inside of the combustion chamber 21, a pilot combustion burner 21A is disposed at the center. A plurality of main combustion burners 21B are disposed along the inner circumferential surface of the combustion chamber 21 in a manner surrounding the pilot combustion burner 21A. The pilot combustion burner 21A includes a pilot cone 21Aa that is supported by the combustion chamber 21 and a pilot nozzle 21Ab that is disposed inside the pilot cone 21Aa. Each of the main combustion burners 21B includes a main nozzle 21Ba and a swirler vane 21Bb that is provided on the outer circumference of the main nozzle 21Ba. In the combustion chamber 21, a pilot fuel line, not illustrated, is coupled to the pilot nozzle 21Ab, and a main combustion line, not illustrated, is coupled to each of the main nozzles 21Ba. In the combustion chamber 21, an inner cylinder 21C surrounding the pilot combustion burner 21A provides a channel for sending the compressed air to the pilot combustion burner 21A, on the inner side of the inner cylinder 21C, and also provides a channel for sending the compressed air to the main combustion burners 21B, on the outer side of the inner cylinder 21C. The tubular shape of the combustion chamber 21 has its axis along the turbine axial direction, and an air inlet 24 is provided as an opening of the tubular shape. This air inlet 24 is disposed facing the outlet 16 of the compressor 1. When high-temperature and high-pressure compressed air flows into the combustion chamber 21 through the air inlet 24, the compressed air becomes mixed with the fuel injected from the main combustion burners 21B, and is turned into swirling flows of pre-mixed gas. The compressed air also becomes mixed with the fuel injected from the pilot combustion burner 21A, is ignited by pilot light not illustrated, becomes combusted and is turned into combustion gas, and discharged into the combustion chamber 21. At this time, a part of the combustion gas is discharged with flames, in a manner diffusing inside the combustion chamber 21, is ignited by the pre-mixed gas flowed out from the main combustion burners 21B to the inside of the combustion chamber 21, and becomes combusted. In other words, with the diffusion flames resulting from the pilot fuel injected from the pilot combustion burner 21A, it is possible to achieve the flame stabilization for ensuring the stable combustion with the lean pre-mixed fuel from the main combustion burner 21B.

Each of the combustion chambers 21 is connected with the compressor 1 via a compressor diffuser 5. The compressor diffuser 5 is a tubular body providing an air passage for leading the compressed air from the compressor 1 to the combustion chamber 21. One end 51 of the compressor diffuser 5 is connected to the outlet 16 of the compressor 1, and the other end 52 is connected to the air inlet 24 of the combustion chamber 21 included in the combustor 2, so that the compressor 1 and each of the combustors 2 are connected thereby.

The turbine 3 generates a rotational driving force using the combustion gas resultant of the combustion in the combustor 2. The turbine 3 has a turbine vane 32 and a turbine blade 33 that are provided inside a cylindrical turbine casing 31. A plurality of the turbine vanes 32 are arranged in rows along the turbine circumferential direction in a manner attached on the side of the turbine casing 31. A plurality of the turbine blades 33 are arranged in rows along the turbine circumferential direction in a manner attached on the side of the turbine shaft 4. The turbine vanes 32 and the turbine blades 33 are provided alternatingly in the turbine axial direction. In the rear side of the turbine casing 31, an exhaust 34 having an exhaust diffuser 34a disposed continuously to the turbine 3 is provided.

The end of the turbine shaft 4 on the side of the compressor 1 is supported by a bearing 41, and the end on the side of the exhaust 34 is supported by a bearing 42. In this manner, the turbine shaft 4 is provided rotatably about the center axis C. The end of the turbine shaft 4 on the side of the compressor 1 is coupled with a driving shaft of a generator, although not illustrated.

In such a gas turbine 101, the air collected from the air intake 11 of the compressor 1 is passed between the compressor vanes 13 and the compressor blades 14, and compressed into high-temperature and high-pressure compressed air. The compressed air is then mixed with the fuel and combusted in the combustor 2, so that high-temperature and high-pressure combustion gas is generated thereby. This combustion gas is then passed between the turbine vanes 32 and the turbine blades 33 provided to the turbine 3, and drives the turbine shaft 4 in rotation, applying a rotational driving force to the generator that is coupled to the turbine shaft 4. In this manner, power is generated. Flue gas having driven the turbine shaft 4 in rotation is passed through the exhaust diffuser 34a in the exhaust 34, and is discharged to the atmosphere as flue gas.

In the gas turbine 101 according to the embodiment, the compressor diffuser 5 includes an air bleed port 55. The air bleed port 55 is provided as a hole communicating with the inside and the outside of the compressor diffuser 5, to bleed the compressed air from the compressor diffuser 5. In this embodiment, the air bleed port 55 is provided to at least one of one end 51 and the other end 52 of the compressor diffuser 5. For example, the air bleed port 55 is a hole formed at the edge of the one end 51 or the other end 52 of the compressor diffuser 5. Therefore, the air bleed port 55 takes out a part of compressed air P that is to be sent from the compressor 1 to the combustion chamber 21 via the compressor diffuser 5, to the inside of the combustor casing 23 having a cylindrical shape that provides the combustor casing chamber R.

In relation to the air bleed port 55, the gas turbine 101 has an intermediate shaft cover 6 that is attached to the outer circumference of the turbine shaft 4, and having a ring-like shape extending along the turbine circumferential direction. On the outer circumference of this intermediate shaft cover 6, the combustor casing chamber R is defined inside the combustor casing 23, on the outer side of the combustion chambers 21.

The gas turbine 101 according to the embodiment also includes a cooling device 7. The cooling device 7 includes an air discharge pipe 71 leading from the combustor casing chamber R to the outside of the combustor casing 23, an air supply pipe 72 leading from the outside of the combustor casing 23 to the inside of the intermediate shaft cover 6 (to the side of the turbine shaft 4) by penetrating the combustor casing 23, a cooling air pipe 73 by which the air discharge pipe 71 communicates with the air supply pipe 72, and a heat exchanger (turbine-cooling air (TCA) cooler) 74 that is provided at a midpoint along the cooling air pipe 73.

Therefore, the compressed air P taken out via the air bleed port 55 into the combustor casing chamber R is discharged to the cooling air pipe 73 provided outside of the combustor casing 23 via the air discharge pipe 71, exchanges heat with coolant in a heat exchanger 74, and is turned into cooling air. The cooling air is then supplied to the inside of the intermediate shaft cover 6 via the air supply pipe 72. With this cooling air, which is the cooled compressed air P, parts such as the turbine vanes 32, the turbine blades 33, and the turbine shaft 4 can be cooled.

The gas turbine 101 according to the embodiment also includes a pressurizing device 8, a pressurizing device diffuser 9, and a manifold 10.

The pressurizing device 8 is provided inside the intermediate shaft cover 6, on the inner side of the turbine vanes 32 (the first stage turbine vanes 32 disposed in an inlet of the turbine 3 in this embodiment), in the turbine radial direction. The pressurizing device 8 is provided as what is called a centrifugal compressor that includes a shroud 8a that is fixed to the turbine shaft 4, a hub 8b facing the shroud 8a in the turbine axial direction, and blades 8c provided between the shroud 8a and the hub 8b. The centrifugal compressor also includes internal channels 8d extending along the turbine axial direction and then directed toward the outer side in the turbine radial direction between the shroud 8a and the hub 8b. In this pressurizing device 8, as the turbine shaft 4 is rotated, the shroud 8a, the hub 8b, and the blades 8c are caused to rotate, and the cooling air, which is the cooled compressed air P, supplied by the cooling device 7 to the inside of the intermediate shaft cover 6 is then suctioned from the turbine axial direction into the internal channels 8d between the shroud 8a and the hub 8b. The cooling air is then discharged from the internal channels 8d to the outer side in the turbine radial direction while having the pressure increased.

The pressurizing device diffuser 9 is fixed to the turbine casing 31, and is provided in a manner continuous to the pressurizing device 8 in the turbine circumferential direction, on the outer side of the pressurizing device 8 in the turbine radial direction. The pressurizing device diffuser 9 includes a pair of guide plates 9a that are plate members together form a ring shape by being disposed in a manner facing each other along the turbine axial direction with the turbine shaft 4 at the center, and provides a passage 9b having a sectional area increasing toward the outer side in the turbine radial direction. The passage 9b is disposed in such a manner that the end of the passage 9b on the inner side in the turbine radial direction faces the outer end of the internal channels 8d of the pressurizing device 8 in the turbine radial direction, that is, the outlets of the internal channels 8d. Therefore, the pressurizing device diffuser 9 decelerates the cooling air, which is the cooled compressed air P, while guiding the cooling air having pressure increased by the pressurizing device 8 on the outer side of the pressurizing device 8 in the turbine radial direction, and having been discharged from the internal channels 8d. The pressurizing device diffuser 9 may include, as the passage 9b, an annular space formed by the turbine casing 31 without being provided with the guide plates 9a. Furthermore, the pressurizing device diffuser 9 may be provided with fixed vanes for adjusting the flows of the cooling air, which is the cooled compressed air P, toward the outer side in the turbine radial direction in the passage 9b.

The manifold 10 is fixed to the turbine casing 31, as illustrated in FIG. 3, and is disposed between the pressurizing device diffuser 9 and the turbine vanes 32 that are arranged in rows along the turbine circumferential direction. The manifold 10 has a ring-shaped passage 10a that is continuous in the turbine circumferential direction with the turbine shaft 4 at the center. The ring-shaped passage 10a in the manifold 10 has an opening 10b that is continuous in the turbine circumferential direction on the inner side in the turbine radial direction, and the manifold 10 is coupled to the pressurizing device diffuser 9 in such a manner that this opening 10b communicates with the outer end in the turbine radial direction of the passage 9b of the pressurizing device diffuser 9. The manifold 10 also has a plurality of holes 10c penetrating the outer side in the turbine radial direction of the ring-shaped passage 10a, and arranged in a row along the turbine circumferential direction. The manifold 10 is then coupled to shroud portions 32b of the turbine vanes 32 in such a manner that the hole 10c communicates with a cooling passage 32a provided to the respective turbine vanes 32. A plurality of the cooling passages 32a are formed inside one turbine vane 32, and the cooling passages 32a are merged to one inlet section 32ba in the shroud portion 32b on the inner side in the turbine radial direction, and the holes 10c are provided in a manner communicating with respective inlet sections 32ba. Therefore, the manifold 10 serves to supply the cooling air, which is the cooled compressed air P, having been guided by the pressurizing device diffuser 9 to the outer side in the turbine radial direction into the cooling passages 32a of the turbine vanes 32 while guiding the cooling air along the turbine circumferential direction.

With such a gas turbine 101, the pressurizing device diffuser 9 guides the cooling air, which is the cooled compressed air P, having the pressure increased by the pressurizing device 8 to the outer side in the turbine radial direction, and the manifold 10 supplies the cooling air, which is the cooled compressed air P, guided by the pressurizing device diffuser 9 to the outer side in the turbine radial direction into the cooling passages 32a in the turbine vanes 32. Therefore, it is possible to suppress a drop in the pressure of the cooling air, which is the cooled compressed air P, having the pressure increased by the pressurizing device 8 and to be supplied to the turbine vanes 32.

Figure 4:
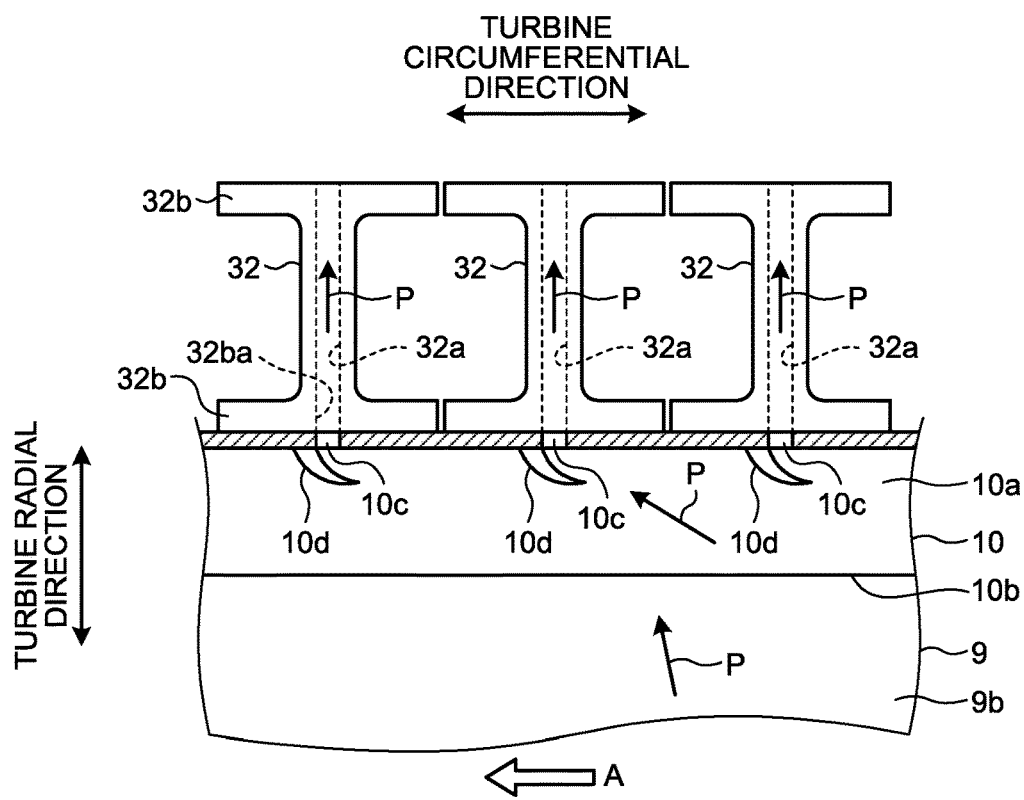
FIG. 4 is a generalized enlarged view of a part of the meridional section in another example of the gas turbine according to the embodiment of the present invention.

FIG. 4 is a generalized enlarged view of another example of a partial meridional section of the gas turbine according to the embodiment.

As illustrated in FIG. 4, in the gas turbine 101 according to the embodiment, guide vanes 10d are provided to the manifold 10. The guide vanes 10d are disposed beside the respective holes 10c in the turbine circumferential direction. Each hole 10c is provided correspondingly to the inlet section 32ba of the cooling passages 32a formed in the turbine vane 32. Specifically, the guide vanes 10d are disposed downstream of the respective holes 10c in a direction in which the turbine shaft 4 is rotated as indicated by the arrow A in FIG. 4 and the cooling air, which is the cooled compressed air P, swirls (i.e., downstream with respect to a cooling air flow direction). Furthermore, the tip ends of the guide vanes 10d that are extending in the ring-shaped passage 10a and are on the outer side in the turbine radial direction are provided toward the upstream side in the turbine circumferential direction and with respect to the direction in which the cooling air, which is the cooled compressed air P, swirls, and each of the guide vanes 10d curves from a base end on the outer side to the tip end on the inner side in the turbine radial direction (the holes 10c). In other words, each of the guide vanes 10d projects upstream from its base end to its tip end so as to provide the guide vanes 10d with a curved shape as shown in FIG. 4. In this manner, the guide vanes 10d guide the cooling air, which is the cooled compressed air P, toward the cooling passages 32a formed in the turbine vanes 32, in the ring-shaped passage 10a of the manifold 10.

With the gas turbine 101 having the structure illustrated in FIG. 4, the guide vanes 10d guiding the cooling air, which is the cooled compressed air P, toward the cooling passages 32a in the turbine vanes 32 suppresses a drop in the pressure of the cooling air, which is the cooled compressed air P, before the cooling air is supplied to the cooling passages 32a via the manifold 10. Therefore, it is possible to suppress a drop in the pressure of the cooling air, which is the cooled compressed air P, having the pressure increased by the pressurizing device 8 and to be supplied to the turbine vanes 32.

Figure 5:
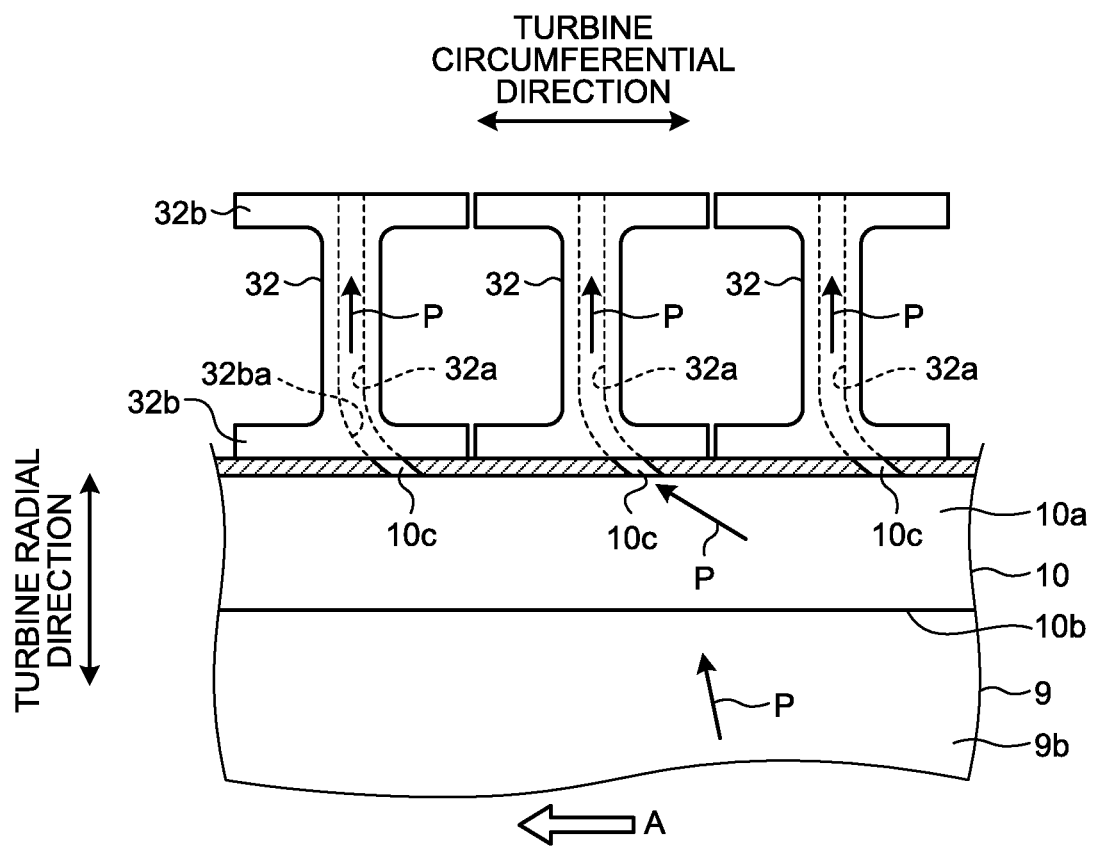
FIG. 5 is a generalized enlarged view of a part of the meridional section in another example of the gas turbine according to the embodiment of the present invention.

FIG. 5 is a generalized enlarged view of another example of a partial meridional section of the gas turbine according to the embodiment.

As illustrated in FIG. 5, in the gas turbine 101 according to the embodiment, a curved portion is provided to the inlet section 32ba of the cooling passages 32a formed in each of the turbine vanes 32. The curved portion is a passage in which the inlet section 32ba of the cooling passages 32a curves from the turbine circumferential direction toward the outer side in the turbine radial direction. Specifically, the curved portion forms a passage in which the inlet section 32ba of the cooling passages 32a opens to the ring-shaped passage 10a in the manifold 10 toward the upstream side of the direction in which the turbine shaft 4 is rotated as indicated by the arrow A in FIG. 5 and the cooling air, which is the compressed air P, swirls. This passage leads from this opening to the cooling passages 32a, the passage being curved from the turbine circumferential direction toward the outer side in the turbine radial direction. In this manner, the curved portion in the inlet section 32ba of the cooling passages 32a guides the cooling air, which is the compressed air P, into the inside of the cooling passages 32a in the turbine vanes 32.

With the gas turbine 101 having the structure illustrated in FIG. 5, the curved portion in the inlet section 32ba of the cooling passage 32a enabling the cooling air, which is the cooled compressed air P, to be guided into the cooling passages 32a in the turbine vanes 32 suppresses a drop in the pressure of the cooling air, which is the cooled compressed air P, to be supplied into the cooling passages 32a via the manifold 10. As a result, it is possible to further suppress a drop in the pressure of the cooling air, which is the cooled compressed air P, having the pressure increased by the pressurizing device 8 and to be supplied to the turbine vanes 32.

It is also preferable as illustrated in FIG. 5 for the holes 10c on the manifold 10 to open to the ring-shaped passage 10a along the direction in which the curved section of the inlet section 32ba of the cooling passage 32a opens toward the upstream side in the direction in which the turbine shaft 4 is rotated as indicated by the arrow A in FIG. 5 and the cooling air, which is the cooled compressed air P, swirls. By providing the manifold 10 with such holes 10c, it is possible to suppress a drop in the pressure of the cooling air, which is the cooled compressed air P, to be supplied from the manifold 10 into the cooling passages 32a.

Furthermore, the curved section of the inlet section 32ba of the cooling passages 32a illustrated in FIG. 5 may be used together with the guide vanes 10d illustrated in FIG. 4.

Figure 6:
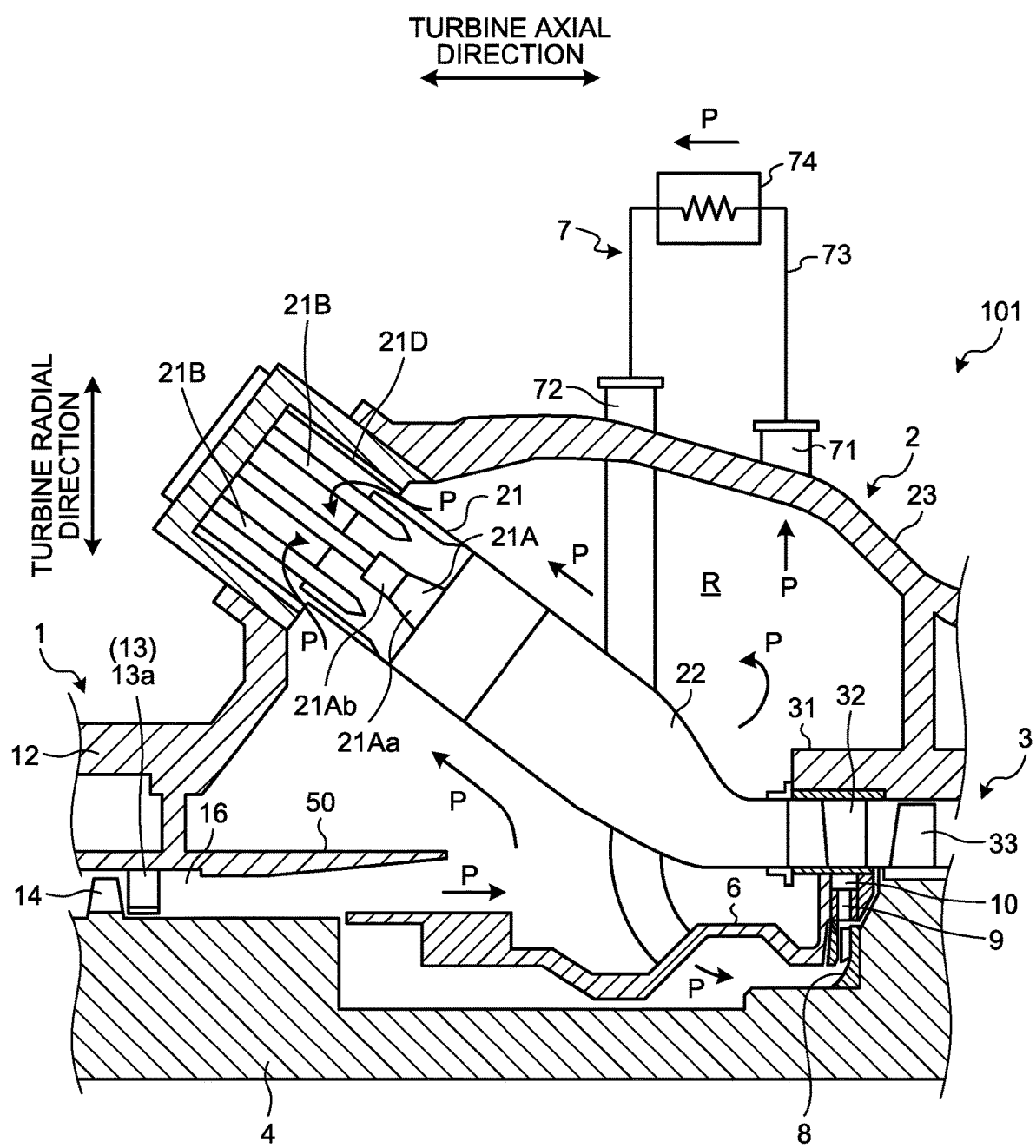
FIG. 6 is an enlarged sectional view around the combustor in another example of the gas turbine according to the embodiment of the present invention.

FIG. 6 is an enlarged sectional view around the combustor in another example of the gas turbine according to the embodiment. In the gas turbine 101 illustrated in FIG. 6, the parts that are equivalent to those in the gas turbine 101 illustrated in FIGS. 1 and 2 are given the same reference signs, and explanations thereof will be omitted.

The gas turbine 101 illustrated in FIG. 6 is different from the gas turbine 101 illustrated in FIGS. 1 and 2 in a compressor diffuser 50 and the structure of a combustor 2.

In the gas turbine 101 illustrated in FIG. 6, the compressor diffuser 50 is provided in a manner opening to the combustor casing chamber R so that the compressed air P can be discharged into the combustor casing chamber R.

The combustor 2 includes an outer casing 21D covering outside of the combustion chamber 21. The outer casing 21D is fixed to the combustor casing 23, and one end of the outer casing 21D opens to the combustor casing chamber R on the outer side of the combustion chamber 21, and the other end communicates with the combustion chamber 21. The compressed air P compressed in the compressor 1 is discharged into the combustor casing chamber R via the compressor diffuser 50, and the compressed air P discharged into the combustor casing chamber R is supplied into the combustion chamber 21 from the one end of the outer casing 21D through the gap between the outer casing 21D and the combustion chamber 21. The combustor 2 then generates combustion gas using the compressed air P supplied into the combustion chamber 21 in the manner described above.

In the manner described above, with the gas turbine 101 having the structure illustrated in FIG. 6, providing the pressurizing device 8, the pressurizing device diffuser 9, and the manifold 10 described above suppresses a drop in the pressure of the cooling air, which is the cooled compressed air P, having the pressure increased by the pressurizing device 8, and to be supplied to the turbine vanes 32.

Explained in the embodiment above is an example in which the pressurizing device 8, the pressurizing device diffuser 9, and the manifold 10 are provided correspondingly to the first stage turbine vanes, but the pressurizing device 8, the pressurizing device diffuser 9, and the manifold 10 may be provided correspondingly to any other turbine vanes.

REFERENCE SIGNS LIST

1 Compressor
11 Air intake
12 Compressor casing
13 Compressor vane
13a Last stage vane
14 Compressor blade
15 Exit guide vane
16 Outlet
2 Combustor
21 Combustion chamber
21A Pilot combustion burner
21Aa Pilot cone
21Ab Pilot nozzle
21B Main combustion burner
21Ba Main nozzle
21Bb Swirler vane
21C Inner cylinder
21D Outer casing
22 Transition piece
23 Combustor casing
24 Air inlet
3 Turbine
31 Turbine casing
32 Turbine vane
32a Cooling passage
32b Shroud portion
32ba Inlet
33 Turbine blade
34 Exhaust
34a Exhaust diffuser
4 Turbine shaft (rotational shaft)
41 Bearing
42 Bearing
5 Compressor diffuser
50 Compressor diffuser
51 One end
52 Other end
55 Air bleed port
6 Intermediate shaft cover
7 Cooling device
71 Air discharge pipe
72 Air supply pipe
73 Cooling air pipe
74 Heat exchanger
8 Pressurizing device
8a Shroud
8b Hub
8c Vane
8d Internal channel
9 Pressurizing device diffuser
9a Guide plate
9b Passage
10 Manifold
10a Ring-shaped passage
10b Opening
10c Hole
10d Guide vane
101 Gas turbine
A Arrow
C Center axis
P Compressed air
R Combustor casing chamber

The invention claimed is:

1. A gas turbine comprising:
a compressor configured to rotate about a rotational shaft to generate compressed air;
a combustor configured to generate combustion gas using the compressed air generated by the compressor;
a turbine configured to drive the rotational shaft in rotation using the combustion gas generated by the combustor;
a cooling device configured to generate cooling air by bleeding the compressed air from the compressor and cooling the compressed air, and to supply the cooling air to the turbine along the rotational shaft;
a pressurizing device disposed between the cooling device and the turbine to increase pressure of the cooling air toward an outer side in a turbine radial direction as the rotational shaft rotates;
a pressurizing device diffuser configured to provide a passage continuing in a turbine circumferential direction, the pressurizing device diffuser being located on the outer side of the pressurizing device in the turbine radial direction so as to guide the cooling air having pressure increased by the pressurizing device to the outer side of the pressurizing device in the turbine radial direction;
a manifold disposed between the pressurizing device diffuser and a plurality of turbine vanes that are arranged in a row along the turbine circumferential direction, the manifold forming a ring-shaped passage continuing in the turbine circumferential direction and configured so that the ring-shaped passage communicates with the passage in the pressurizing device diffuser and with a cooling passage provided inside each of the turbine vanes; and
a plurality of guide vanes inside the ring-shaped passage of the manifold, each of the guide vanes being arranged to guide the cooling air toward the cooling passage of a respective one of the turbine vanes,
wherein the ring-shaped passage of the manifold has an inner side with respect to the turbine radial direction and an outer side with respect to the turbine radial direction, the inner side of the ring-shaped passage being formed continuously in the turbine circumferential direction so as to communicate with an outer end of the pressurizing device diffuser in the turbine radial direction, the outer side having a plurality of holes penetrating the outer side and arranged in a row along the turbine circumferential direction, each of the holes communicating with the cooling passage of a respective one of the turbine vanes, each of the guide vanes having a base end on the outer side surface of the ring-shaped passage of the manifold and projecting radially inwardly from the outer side surface toward the pressurizing device diffuser, and being located downstream of a respective one of the holes with respect to a cooling air flow direction in which the cooling air swirls, the cooling air flow direction being a direction in which the rotational shaft rotates.

2. The gas turbine according to claim 1, wherein a tip end of each of the guide vanes extends toward an upstream side with respect to the cooling air flow direction, and the guide vane curves from the base end on the outer side surface with respect to the turbine radial direction to the tip end on the inner side with respect to the turbine radial direction so as to have a convex shape toward a downstream side in the cooling air flow direction.

3. A gas turbine comprising:
a compressor configured to rotate about a rotational shaft to generate compressed air;
a combustor configured to generate combustion gas using the compressed air generated by the compressor;
a turbine configured to drive the rotational shaft in rotation using the combustion gas generated by the combustor;
a cooling device configured to generate cooling air by bleeding the compressed air from the compressor and cooling the compressed air, and to supply the cooling air to the turbine along the rotational shaft;
a pressurizing device disposed between the cooling device and the turbine to increase pressure of the cooling air toward an outer side in a turbine radial direction as the rotational shaft rotates;
a pressurizing device diffuser configured to provide a passage continuing in a turbine circumferential direction, the pressurizing device diffuser being located on the outer side of the pressurizing device in the turbine radial direction so as to guide the cooling air having pressure increased by the pressurizing device to the outer side of the pressurizing device in the turbine radial direction; and
a manifold disposed between the pressurizing device diffuser and a plurality of turbine vanes that are arranged in a row along the turbine circumferential direction, the manifold forming a ring-shaped passage continuing in the turbine circumferential direction and configured so that the ring-shaped passage communicates with the passage in the pressurizing device diffuser and with a cooling passage provided inside each of the turbine vanes,
wherein the ring-shaped passage of the manifold has an inner side with respect to the turbine radial direction and an outer side with respect to the turbine radial direction, the inner side of the ring-shaped passage being formed continuously in the turbine circumferential direction so as to communicate with an outer end of the pressurizing device diffuser in the turbine radial direction, the outer side having a plurality of holes penetrating an outer side surface of the ring-shaped passage of the manifold and arranged in a row along the turbine circumferential direction, each of the holes communicating with the cooling passage of a respective one of the turbine vanes, each of the cooling passages having a curved section in an inlet section of the cooling passage of each of the turbine vanes, the cooling passage of each of the turbine vanes communicating with the ring-shaped passage, the curved section curving in an upstream direction with respect to a cooling air flow direction from the outer side in the turbine radial direction to the inner side in the turbine radial direction so as to be convex toward a downstream side in the cooling air flow direction, the cooling air flow direction being a direction in which the rotational shaft rotates.

* * * * *